US012763003B2

(12) United States Patent
Kim

(10) Patent No.: US 12,763,003 B2
(45) Date of Patent: Oct. 13, 2026

(54) DISPLAY APPARATUS, METHOD OF DRIVING DISPLAY PANEL USING THE SAME AND ELECTRONIC APPARATUS INCLUDING THE SAME

(71) Applicant: Samsung Display Co., LTD., Yongin-si (KR)

(72) Inventor: Woung Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/011,951

(22) Filed: Jan. 7, 2025

(65) Prior Publication Data

US 2025/0322783 A1 Oct. 16, 2025

(30) Foreign Application Priority Data

Apr. 16, 2024 (KR) ........................ 10-2024-0050857

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0452* (2013.01); *G09G 2310/0275* (2013.01); *G09G 2320/0233* (2013.01); *G09G 2320/0238* (2013.01); *G09G 2320/0257* (2013.01); *G09G 2320/045* (2013.01); *G09G 2330/021* (2013.01)

(58) Field of Classification Search
CPC ................... G09G 3/32; G09G 3/3233; G09G 2300/0452; G09G 2310/0275; G09G 2320/0233; G09G 2320/0238; G09G 2320/0257; G09G 2320/045; G09G 2330/021
See application file for complete search history.

(56) References Cited

U.S. PATENT DOCUMENTS

2004/0095402 A1* 5/2004 Nakano ................ G06F 3/0412 346/102
2014/0118409 A1 5/2014 Jun et al.
2015/0001504 A1 1/2015 Kim et al.
2017/0092191 A1* 3/2017 An ...................... G09G 3/3233
(Continued)

FOREIGN PATENT DOCUMENTS

CN 113903286 A 1/2022
KR 102469801 B1 11/2022
WO 2024045067 A1 3/2024

OTHER PUBLICATIONS

Extended European Search Report dated Jul. 16, 2025 in EP Application No. 25169934.4, 14 pages.

*Primary Examiner* — Michael J Jansen, II
(74) *Attorney, Agent, or Firm* — CANTOR COLBURN LLP

(57) ABSTRACT

A display apparatus includes a display panel, a data driver and a driving controller. The data driver is which outputs a data voltage to the display panel. The driving controller determines a black voltage based on a driving frequency and a luminance setting value and determines an anode initialization voltage based on the driving frequency and the luminance setting value. A first anode initialization voltage of a first pixel having a first color is different from a second anode initialization voltage of a second pixel having a second color.

23 Claims, 11 Drawing Sheets

(56) References Cited

U.S. PATENT DOCUMENTS

| | | | | |
|---|---|---|---|---|
| 2021/0159284 | A1* | 5/2021 | Huang | H10K 59/131 |
| 2021/0280127 | A1* | 9/2021 | An | G09G 3/32 |
| 2022/0044634 | A1* | 2/2022 | Ka | G09G 3/3258 |
| 2022/0199026 | A1* | 6/2022 | Park | G09G 3/2003 |
| 2023/0129065 | A1* | 4/2023 | Yoon | G09G 3/2092<br>345/204 |
| 2023/0133179 | A1* | 5/2023 | Lu | H10K 59/1315<br>345/206 |
| 2023/0143803 | A1 | 5/2023 | Lee et al. | |
| 2023/0225160 | A1* | 7/2023 | Cho | H10D 86/441<br>345/694 |
| 2023/0230535 | A1 | 7/2023 | Hu et al. | |
| 2023/0245619 | A1* | 8/2023 | Yoon | G09G 3/3208<br>345/691 |
| 2023/0267869 | A1* | 8/2023 | Park | G09G 3/2074<br>345/690 |
| 2024/0071305 | A1* | 2/2024 | Kim | G09G 3/3233 |
| 2024/0331655 | A1* | 10/2024 | Hu | G09G 3/3648 |
| 2024/0347002 | A1* | 10/2024 | Pyo | G09G 3/3233 |
| 2024/0412676 | A1* | 12/2024 | Kim | G09G 3/2074 |
| 2025/0124865 | A1* | 4/2025 | Yao | G09G 3/3233 |
| 2025/0131880 | A1 | 4/2025 | Zhang et al. | |
| 2025/0265988 | A1* | 8/2025 | Seo | G09G 3/3233 |
| 2025/0299609 | A1* | 9/2025 | Pyo | G09G 3/2007 |

* cited by examiner

DISPLAY APPARATUS, METHOD OF DRIVING DISPLAY PANEL USING THE SAME AND ELECTRONIC APPARATUS INCLUDING THE SAME

This application claims priority to Korean Patent Application No. 10-2024-0050857, filed on Apr. 16, 2024, and all the benefits accruing therefrom under 35 U.S.C. § 119, the content of which in its entirety is herein incorporated by reference.

BACKGROUND

1. Field

Embodiments of the invention relate to a display apparatus, a method of driving a display panel using the display apparatus and an electronic apparatus including the display apparatus. More particularly, embodiments of the invention relate to a display apparatus with enhanced display quality and reduced power consumption by determining a black voltage and an anode initialization voltage based on a driving frequency and a luminance setting value, a method of driving a display panel using the display apparatus and an electronic apparatus including the display apparatus.

2. Description of the Related Art

Generally, a display apparatus includes a display panel and a display panel driver. The display panel may include a plurality of gate lines, a plurality of data lines, a plurality of emission lines and a plurality of pixels. The display panel driver may include a gate driver, a data driver, an emission driver and a driving controller. The gate driver may output gate signals to the gate lines. The data driver may output data voltages to the data lines. The emission driver may output emission signals to the emission lines. The driving controller may control an operation of the gate driver, an operation of the data driver and an operation of the emission driver.

SUMMARY

In a display device, when a black luminance is adjusted only by adjusting a black voltage, the black voltage may become too high and a range between a lowest grayscale voltage (the black voltage) and a highest grayscale voltage increases such that an instantaneous afterimage may occur due to a hysteresis of a driving switching element.

In addition, when the black luminance is adjusted only by adjusting the black voltage, the black voltage may become too high such that a power consumption may increase.

In addition, when the black voltage is fixed regardless of a luminance setting value, a higher black voltage than a predetermined desired voltage may be used at a low luminance setting value, and accordingly, a range between the lowest grayscale voltage (the black voltage) and the highest grayscale voltage increases such that the instantaneous afterimage may occur due to the hysteresis of the driving switching element.

In addition, when the black voltage is fixed regardless of the luminance setting value, a higher black voltage than a predetermined desired voltage may be used at the low luminance setting value such that the power consumption may increase.

In addition, when a higher black voltage than desired is used in a high frequency driving method, the power consumption may further increase.

In addition, in a method of setting a black voltage at predetermined measuring points of the luminance setting value, an undesired high luminance may be displayed in an interpolation range between the measuring points.

Embodiments of the invention provide a display apparatus with enhanced display quality and reduced power consumption by determining a black voltage and an anode initialization voltage based on a driving frequency and a luminance setting value.

Embodiments of the invention also provide a method of driving a display panel using the display apparatus.

Embodiments of the invention also provide an electronic apparatus including the display apparatus.

In an embodiment of a display apparatus according to the invention, the display apparatus includes a display panel, a data driver and a driving controller. In such an embodiment, the data driver outputs a data voltage to the display panel. In such an embodiment, the driving controller determines a black voltage based on a driving frequency and a luminance setting value and determines an anode initialization voltage based on the driving frequency and the luminance setting value. In such an embodiment, a first anode initialization voltage of a first pixel having a first color is different from a second anode initialization voltage of a second pixel having a second color.

In an embodiment, the black voltage may be determined in a way such that a measured luminance of the display panel is less than a first target luminance.

In an embodiment, the anode initialization voltage may be determined in a way such that the measured luminance of the display panel is less than a second target luminance less than the first target luminance.

In an embodiment, the display panel may include the first pixel having the first color, the second pixel having the second color and a third pixel having a third color. In such an embodiment, at least one selected from an initial value of the first anode initialization voltage of the first pixel, an initial value of the second anode initialization voltage of the second pixel and an initial value of a third anode initialization voltage of the third pixel may be different from another initial value selected therefrom. In such an embodiment, at least one selected from an offset for changing the initial value of the first anode initialization voltage of the first pixel, an offset for changing the initial value of the second anode initialization voltage of the second pixel and an offset for changing the initial value of the third anode initialization voltage of the third pixel may be different from another offset selected therefrom.

In an embodiment, an anode initialization voltage of a red pixel may be different from at least one selected from an anode initialization voltage of a green pixel and an anode initialization voltage of a blue pixel.

In an embodiment, the anode initialization voltage of the red pixel may be less than the anode initialization voltage of the green pixel. In such an embodiment, the anode initialization voltage of the green pixel may be less than the anode initialization voltage of the blue pixel.

In an embodiment, the black voltage may have the same level regardless of a color of a pixel.

In an embodiment, a first black voltage of the first pixel having the first color may be different from a second black voltage of the second pixel having the second color.

In an embodiment, the display panel may include the first pixel having the first color, the second pixel having the second color and a third pixel having a third color. In such an embodiment, at least one selected from an initial value of the first black voltage of the first pixel, an initial value of the second black voltage of the second pixel and an initial value of a third black voltage of the third pixel may be different from another initial value selected therefrom. In such an embodiment, at least one selected from an offset for changing the initial value of the first black voltage of the first pixel, an offset for changing the initial value of the second black voltage of the second pixel and an offset for changing the initial value of the third black voltage of the third pixel may be different from another offset selected therefrom.

In an embodiment, a black voltage of a red pixel may be different from at least one selected from a black voltage of a green pixel and a black voltage of a blue pixel.

In an embodiment, the black voltage of the red pixel may be greater than the black voltage of the green pixel. In such an embodiment, the black voltage of the green pixel may be greater than the black voltage of the blue pixel.

In an embodiment, as the driving frequency decreases, the black voltage may increase.

In an embodiment, as the driving frequency decreases, the anode initialization voltage may decrease.

In an embodiment, as the luminance setting value increases, the black voltage may increase.

In an embodiment, as the luminance setting value increases, the anode initialization voltage may decrease.

In an embodiment, the driving controller may determine the black voltage based on the driving frequency, the luminance setting value and a temperature and determine the anode initialization voltage based on the driving frequency, the luminance setting value and the temperature.

In an embodiment, the black voltage may have a same level regardless of a color of a pixel.

In an embodiment, a first black voltage of the first pixel having the first color may be different from a second black voltage of the second pixel having the second color.

In an embodiment, as the temperature increases, the black voltage may increase.

In an embodiment, as the temperature increases, the anode initialization voltage may decrease.

In an embodiment, the display panel may include a pixel. In such an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives a first initialization voltage and a second electrode connected to the first pixel node, a fifth pixel switching element including a control electrode which receives an emission signal, a first electrode which receive a first pixel power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives the anode initialization voltage and a second electrode connected to the anode electrode of the light emitting element and the light emitting element including the anode electrode and a cathode electrode which receives a second pixel power voltage.

In an embodiment of a method of driving a display panel according to the invention, the method includes determining initial values of a black voltage for driving frequencies and luminance setting values, determining the black voltage by changing an initial value of the black voltage in a way such that a measured luminance of the display panel is less than a first target luminance, determining initial values of an anode initialization voltage for the driving frequencies and the luminance setting values, determining the anode initialization voltage by changing the initial value of the anode initialization voltage in a way such that the measured luminance of the display panel is less than a second target luminance less than the first target luminance, storing black voltages and anode initialization voltages for the driving frequencies and the luminance setting values in a memory, generating the black voltage and the anode initialization voltage based on an input driving frequency and an input luminance setting value, determining a data voltage based on the black voltage, outputting the data voltage to a pixel of the display panel and outputting the anode initialization voltage to the pixel.

In an embodiment of a method of driving a display panel according to the invention, the method includes determining initial values of a black voltage for driving frequencies, luminance setting values and temperatures, determining the black voltage by changing an initial value of the black voltage in a way such that a measured luminance of the display panel is less than a first target luminance, determining initial values of an anode initialization voltage for the driving frequencies, the luminance setting values and the temperatures, determining the anode initialization voltage by changing the initial value of the anode initialization voltage in a way such that the measured luminance of the display panel is less than a second target luminance less than the first target luminance, storing black voltages and anode initialization voltages for the driving frequencies, the luminance setting values and the temperatures in a memory, generating the black voltage and the anode initialization voltage based on an input driving frequency, an input luminance setting value and an input temperature, determining a data voltage based on the black voltage, outputting the data voltage to a pixel of the display panel and outputting the anode initialization voltage to the pixel.

In an embodiment of an electronic apparatus according to the invention, the electronic apparatus includes a display panel, a data driver, a driving controller and a host. In such an embodiment, the data driver outputs a data voltage to the display panel. In such an embodiment, the driving controller controls the data driver. In such an embodiment, the host outputs input image data and an input control signal to the driving controller. In such an embodiment, the driving controller determines a black voltage based on a driving frequency and a luminance setting value and determines an anode initialization voltage based on the driving frequency and the luminance setting value. In such an embodiment, a first anode initialization voltage of a first pixel having a first color is different from a second anode initialization voltage of a second pixel having a second color.

According to embodiments of the display apparatus, the method of driving the display panel using the display panel and the electronic apparatus including the display apparatus, the driving controller may determine the black voltage and the anode initialization voltage based on the driving frequency and the luminance setting value. The anode initialization voltage may be set differently according to a color of the pixel.

In such embodiments, the black voltage and the anode initialization voltage are determined based on the driving frequency and the luminance setting value such that the black luminance of the display panel may be sufficiently reduced to match a target luminance without excessively increasing the black voltage.

In such embodiments, the anode initialization voltage is set differently according to the color of the pixel such that the black image may be effectively prevented from biased toward a specific color (e.g., reddish).

In such embodiments, the black voltage and the anode initialization voltage are determined based on the luminance setting value, a high black voltage than a predetermined desired voltage may not be used at the low luminance setting value such that a range between the lowest grayscale voltage (the black voltage) and the highest grayscale voltage may be substantially reduced. When the range between the lowest grayscale voltage (the black voltage) and the highest grayscale voltage is reduced, an instantaneous afterimage due to a hysteresis of the driving switching element may be effectively prevented and the power consumption may be substantially reduced.

In such embodiments, the black voltage and the anode initialization voltage are determined based on the driving frequency and the luminance setting value such that an undesired high luminance may be effectively prevented from being displayed in an interpolation range between the predetermined measuring points of the luminance setting value.

In such embodiments, the black voltage and the anode initialization voltage are determined based on the driving frequency and the luminance setting value such that a step efficiency characteristic, which refers to a luminance difference between a first frame and a second frame, may be enhanced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
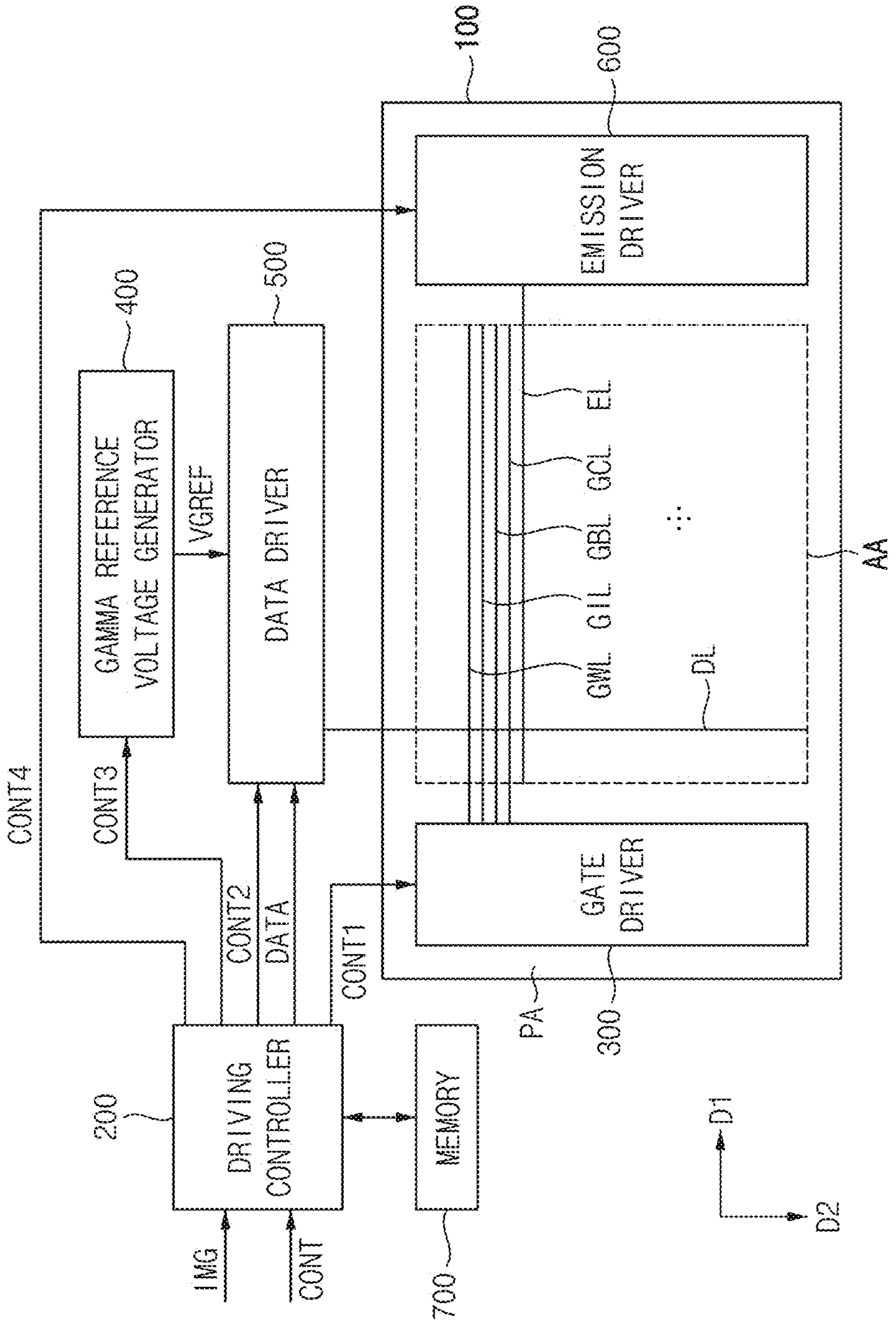
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400, a data driver 500 and an emission driver 600.

In an embodiment, for example, the driving controller 200 and the data driver 500 may be integratedly or integrally formed. In an embodiment, for example, the driving controller 200, the gamma reference voltage generator 400 and the data driver 500 may be integratedly or integrally formed. A driving module including at least the driving controller 200 and the data driver 500 which are integratedly formed may be referred to a timing controller embedded data driver (“TED”).

The display panel 100 has a display region AA on which an image is displayed and a peripheral region PA adjacent to the display region AA.

The display panel 100 includes a plurality of gate lines GWL, GIL, GBL and GCL, a plurality of data lines DL, a plurality of emission lines EL and a plurality of pixels electrically connected to the gate lines GWL, GIL, GBL and GCL, the data lines DL and the emission lines EL. The gate lines GWL, GIL, GBL and GCL may extend in a first direction D1, the data lines DL may extend in a second direction D2 crossing the first direction D1 and the emission lines EL may extend in the first direction D1.

The driving controller 200 may receive input image data IMG and an input control signal CONT from an external apparatus. In an embodiment, for example, the driving controller 200 may receive the input image data IMG and the input control signal CONT from a host. In an embodiment, for example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GBL and GCL in response to the first control signal CONT1 received from the driving controller 200. The gate driver 300 may output the gate signals to the gate lines GWL, GIL, GBL and GCL. In an embodiment, for example, the gate driver 300 may be integrated on the peripheral region PA of the display panel 100. In an embodiment, for example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. In an embodiment, for example, the emission driver 600 may be integrated on the peripheral region PA of the display panel 100. For example, the emission driver 600 may be mounted on the peripheral region PA of the display panel 100.

Although an embodiment where the gate driver 300 is disposed at a first side of the display panel 100 and the emission driver 600 is disposed at a second side of the display panel 100 opposite to the first side is shown in FIG. 1 for convenience of illustration, the invention may not be limited thereto. In another embodiment, for example, both of the gate driver 300 and the emission driver 600 may be disposed at the first side of the display panel 100. In another embodiment, for example, both of the gate driver 300 and the emission driver 600 may be disposed both sides of the display panel 100. In another embodiment, for example, the gate driver 300 and the emission driver 600 may be integratedly or integrally formed.

The display apparatus may further include a memory 700. The driving controller 200 may receive data for compensating the input image data IMG and data for determining a level of a power voltage from the memory 700. The driving controller 200 may instruct to store the data for compensating the input image data IMG and data for determining a level of the power voltage to the memory 700.

Figure 2:
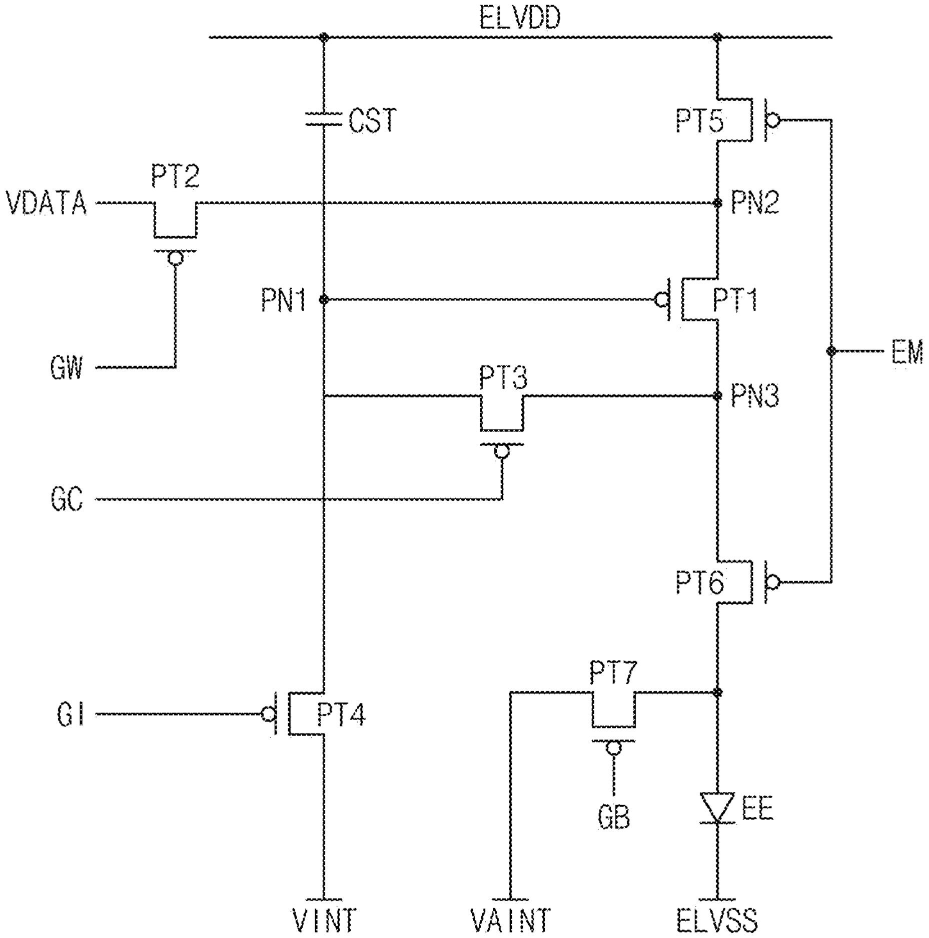
FIG. 2 is a circuit diagram illustrating a pixel of a display panel of FIG. 1.

FIG. 2 is a circuit diagram illustrating a pixel of the display panel 100 of FIG. 1. Referring to FIGS. 1 and 2, an embodiment of the display panel 100 includes the plurality of the pixels. Each pixel includes a light emitting element EE.

The pixel receives a data writing gate signal GW, a compensation gate signal GC, a data initialization gate signal GI, a light emitting element initialization gate signal GB, the data voltage VDATA and the emission signal EM and the light emitting element EE of the pixel emits light corresponding to the level of the data voltage VDATA to display the image.

In an embodiment, switching elements of the pixel may be polysilicon thin film transistors. In an embodiment, for example, the switching elements of the pixel may be a low temperature polysilicon (LTPS) thin film transistors. In an embodiment, for example, the switching elements of the pixel may be P-type transistors.

Alternatively, the pixel may include at least one oxide semiconductor thin film transistor. The pixel may include at least one N-type transistor.

In an embodiment, for example, the pixel may include first, second, third, fourth, fifth, sixth and seventh pixel switching elements PT1, PT2, PT3, PT4, PT5, PT6 and PT7, a storage capacitor CST and the light emitting element EE.

The first pixel switching element PT1 includes a control electrode connected to a first pixel node PN1, a first electrode connected to a second pixel node PN2 and a second electrode connected to a third pixel node PN3. The first pixel switching element PT1 may be referred to a driving switching element.

The second pixel switching element PT2 includes a control electrode that receives the data writing gate signal GW, a first electrode that receives the data voltage VDATA and a second electrode connected to the second pixel node PN2.

The third pixel switching element PT3 includes a control electrode that receives the compensation gate signal GC, a first electrode connected to the first pixel node PN1 and a second electrode connected to the third pixel node PN3.

The fourth pixel switching element PT4 includes a control electrode that receives the data initialization gate signal GI, a first electrode that receives a first initialization voltage VINT and a second electrode connected to the first pixel node PN1.

The fifth pixel switching element PT5 includes a control electrode that receives the emission signal EM, a first electrode that receives a first pixel power voltage ELVDD and a second electrode connected to the second pixel node PN2.

The sixth pixel switching element PT6 includes a control electrode that receives the emission signal EM, a first electrode connected to the third pixel node PN3 and a second electrode connected to an anode electrode of the light emitting element EE.

The seventh pixel switching element PT7 includes a control electrode that receives the light emitting element initialization gate signal GB, a first electrode that receives a second initialization voltage VAINT and a second electrode connected to the anode electrode of the light emitting element EE. Although the second initialization voltage VAINT is applied to the first electrode of the seventh pixel switching element PT7 in an embodiment, the invention may not be limited thereto. In an embodiment, the first initialization voltage VINT may be applied to the first electrode of the seventh pixel switching element PT7. The second initialization voltage VAINT may be referred to an anode initialization voltage.

The storage capacitor CST includes a first electrode that receives the first pixel power voltage ELVDD and a second electrode connected to the first pixel node PN1.

The light emitting element EE includes the anode electrode and a cathode electrode that receives a second pixel power voltage ELVSS.

The first pixel power voltage ELVDD may be greater than the second pixel power voltage ELVSS.

Figure 3:
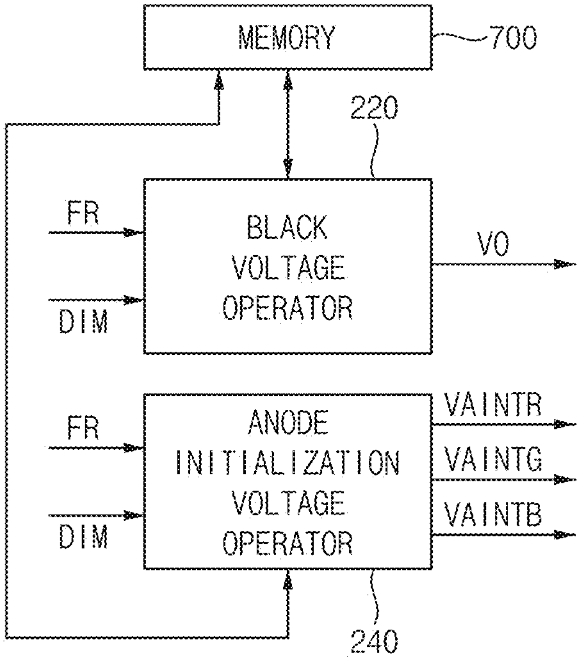
FIG. 3 is a block diagram illustrating a driving controller of FIG. 1 and a memory of FIG. 1.
Figure 4:
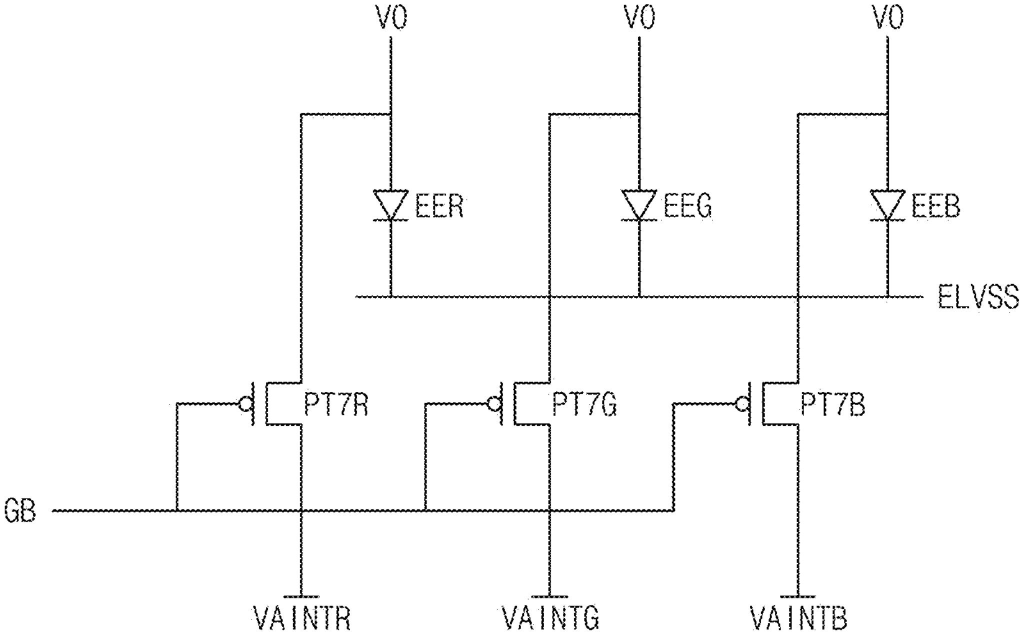
FIG. 4 is a circuit diagram illustrating a portion of the display panel of FIG. 1.
Figure 5:
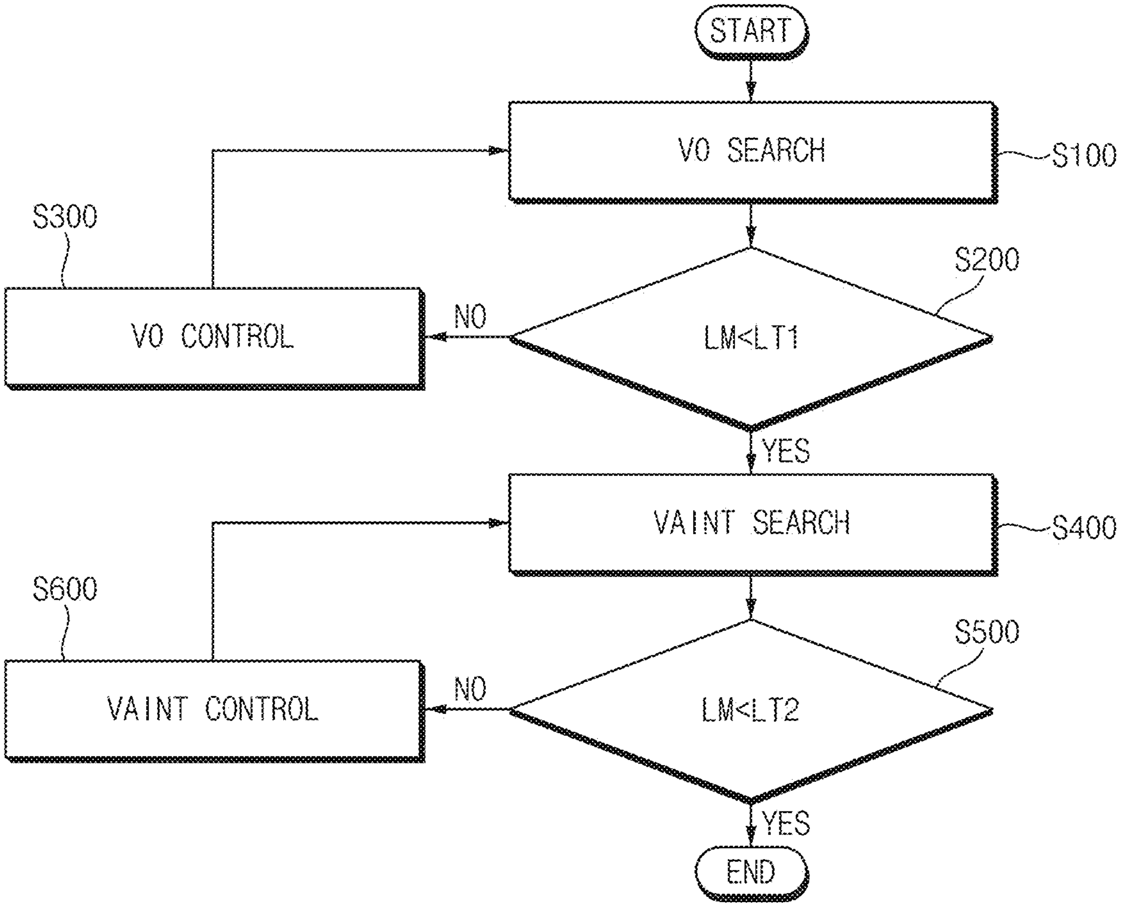
FIG. 5 is a flowchart diagram illustrating a method of determining a black voltage of FIG. 4 and an anode initialization voltage of FIG. 4.
Figure 6:
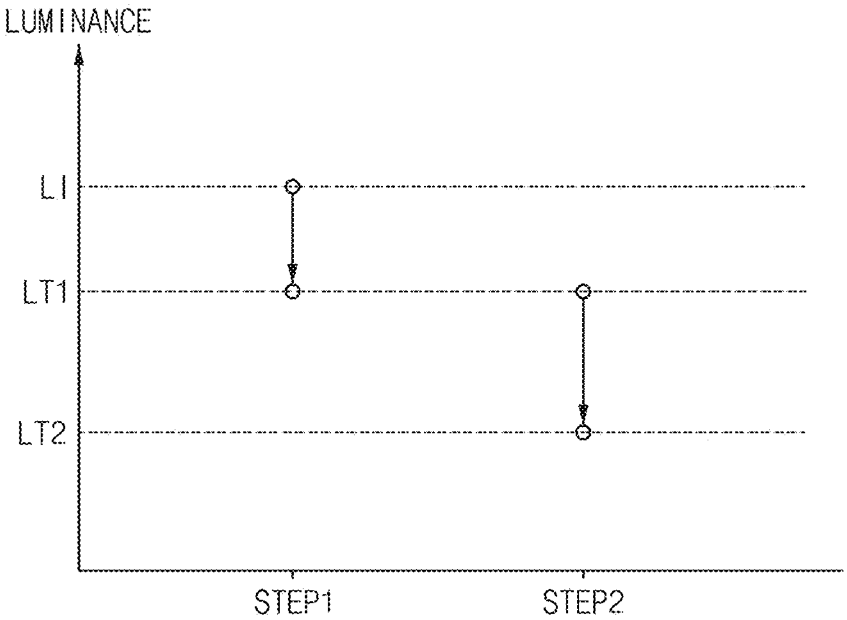
FIG. 6 is a graph illustrating a method of determining the black voltage of FIG. 4 and the anode initialization voltage of FIG. 4.
Figure 7:
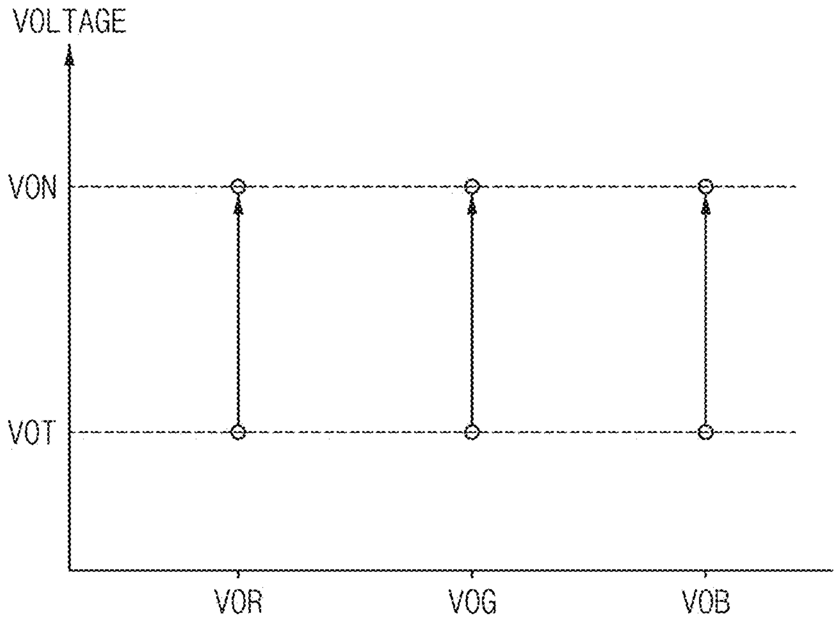
FIG. 7 is a graph illustrating a method of determining the black voltage of FIG. 4.
Figure 8:
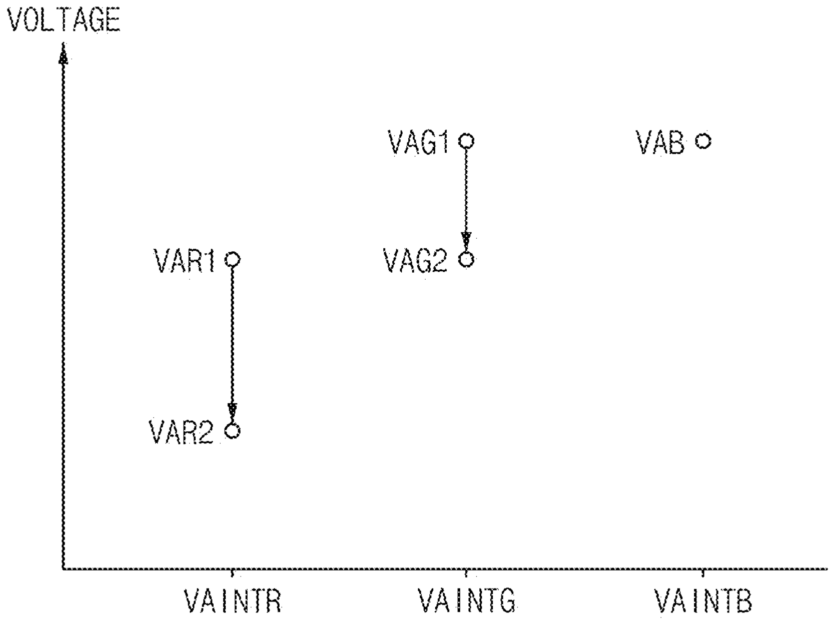
FIG. 8 is a graph illustrating a method of determining the anode initialization voltage of FIG. 4.
Figure 9:
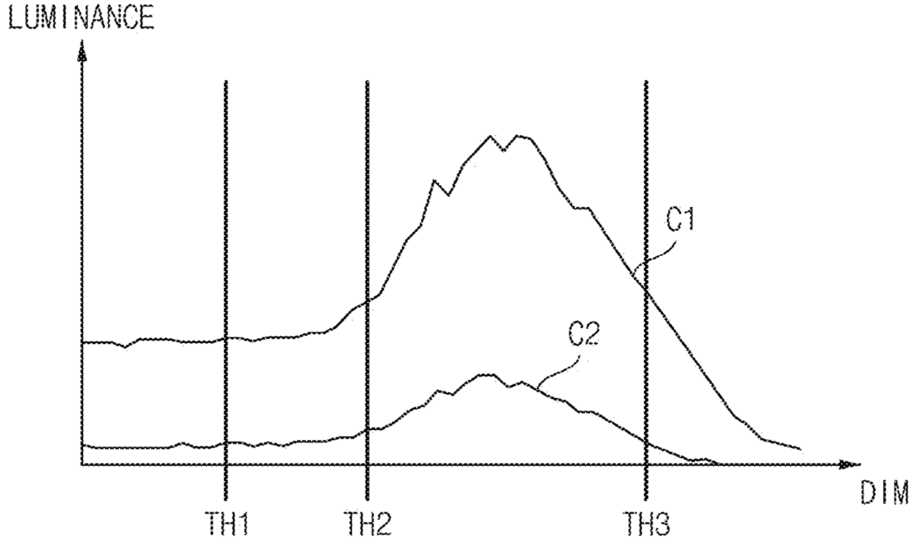
FIG. 9 is a graph illustrating a black luminance of the display panel of FIG. 1 according to a luminance setting value.

FIG. 3 is a block diagram illustrating the driving controller 200 of FIG. 1 and the memory 700 of FIG. 1. FIG. 4 is a circuit diagram illustrating a portion of the display panel 100 of FIG. 1. FIG. 5 is a flowchart diagram illustrating a method of determining a black voltage V0 of FIG. 4 and an anode initialization voltage VAINTR, VAINTG and VAINTB of FIG. 4. FIG. 6 is a graph illustrating a method of determining the black voltage V0 of FIG. 4 and the anode initialization voltage VAINTR, VAINTG and VAINTB of FIG. 4. FIG. 7 is a graph illustrating a method of determining the black voltage V0 of FIG. 4. FIG. 8 is a graph illustrating a method of determining the anode initialization voltage VAINTR, VAINTG and VAINTB of FIG. 4. FIG. 9 is a graph illustrating a black luminance of the display panel 100 of FIG. 1 according to a luminance setting value DIM.

Referring to FIGS. 1 to 9, in an embodiment, the driving controller 200 determines the black voltage V0 based on a driving frequency FR and the luminance setting value DIM and the anode initialization voltage VAINTR, VAINTG and VAINTB based on the driving frequency FR and the luminance setting value DIM. A first anode initialization voltage (e.g., VAINTR) of a first pixel having a first color is different from a second anode initialization voltage (e.g., VAINTG) of a second pixel having a second color. The host may output the luminance setting value DIM to the driving controller 200. The host may output the driving frequency FR to the driving controller 200. Alternatively, the driving controller 200 may determine the driving frequency FR based on the input image data IMG.

The black voltage V0 may mean a data voltage corresponding to a grayscale value of zero. The anode initialization voltage may mean a voltage applied to the anode electrode of the light emitting element EE through the seventh pixel switching element PT7. The luminance setting value DIM may mean a degree of a luminance of the display panel 100 set by the user. Alternatively, the luminance setting value DIM may be automatically set based on an ambient luminance. The luminance setting value DIM may be set based on a maximum luminance value for a maximum grayscale value.

The driving controller 200 may include a black voltage operator 220 that determines the black voltage V0 based on the driving frequency FR and the luminance setting value DIM and an anode initialization voltage operator 240 that determines the anode initialization voltage VAINTR, VAINTG and VAINTB based on the driving frequency FR and the luminance setting value DIM.

Through an initial setting operation, the black voltage V0 and the anode initialization voltage VAINTR, VAINTG and VAINTB may be stored in the memory 700 for each driving frequency FR and each luminance setting value DIM.

The black voltage operator 220 and the anode initialization voltage operator 240 may communicate with the memory 700 and may generate the black voltage V0 and the anode initialization voltage VAINTR, VAINTG and VAINTB based on an input driving frequency FR and an input luminance setting value DIM.

The display panel 100 may include the first pixel (e.g., a red pixel) having the first color, the second pixel (e.g., a green pixel) having the second color and a third pixel (e.g., a blue pixel) having a third color.

As shown in FIG. 4, the red pixel may include a red light emitting element EER and a red light emitting element initialization switching element PT7R, the green pixel may include a green light emitting element EEG and a green light emitting element initialization switching element PT7G and the blue pixel may include a blue light emitting element EEB and a blue light emitting element initialization switching element PT7B.

A threshold voltage of the red light emitting element EER, a threshold voltage of the green light emitting element EEG and a threshold voltage of the blue light emitting element EEB may be different from one another such that a turn-on timing of the red light emitting element EER, a turn-on timing of the green light emitting element EEG and a turn-on timing of the blue light emitting element EEB may be different from one another when a same anode initialization voltage is applied to the red light emitting element EER, the green light emitting element EEG and the blue light emitting element EEB. Thus, when the display panel 100 displays the black image, the black image may be biased toward a specific color. In an embodiment, for example, the threshold voltage of the red light emitting element EER may be the smallest among the threshold voltage of the red light emitting element EER, the threshold voltage of the green light emitting element EEG and a threshold voltage of the blue light emitting element EEB. In an embodiment, for example, the threshold voltage of the blue light emitting element EEB may be the greatest among the threshold voltage of the red light emitting element EER, the threshold voltage of the green light emitting element EEG and a threshold voltage of the blue light emitting element EEB.

Thus, an anode initialization voltage VAINTR of the red pixel may be different from at least one selected from an anode initialization voltage VAINTG of the green pixel and an anode initialization voltage VAINTB of the blue pixel.

In an embodiment, for example, the anode initialization voltage VAINTR of the red pixel may be less than the anode initialization voltage VAINTG of the green pixel. The anode initialization voltage VAINTG of the green pixel may be less than the anode initialization voltage VAINTB of the blue pixel.

As shown in FIGS. 5 to 8, in an embodiment, the black voltage V0 may be determined in a way such that a measured luminance of the display panel 100 is less than a first target luminance LT1 (STEP1 in FIG. 6). In addition, the anode initialization voltage VAINTR, VAINTG and VAINTB may be determined in a way such that the measured luminance of the display panel 100 is less than a second target luminance LT2 less than the first target luminance LT1 (STEP2 in FIG. 6). Herein, an initial measured luminance of the display panel 100 is represented as LI. Herein, the measured luminance, the first target luminance LT1 and the second target luminance LT2 may mean a luminance of the black image corresponding to a black grayscale value.

The measured luminance may be controlled to be less than the first target luminance LT1 by adjusting the black voltage V0. However, when the measured luminance is controlled to be less than the first target luminance LT1 by adjusting the black voltage V0, the black voltage V0 may become excessively high such that the display quality may be deteriorated and the power consumption may increase. Thus, after the measured luminance is controlled to be less than the first target luminance LT1 by adjusting the black voltage V0, the measured luminance may be controlled to be less than the second target luminance LT2 by adjusting the anode initialization voltage VAINTR, VAINTG and VAINTB.

In an embodiment, for example, as the driving frequency FR decreases, the black voltage V0 may increase. When the driving frequency FR is small, a risk of current leakage occurring through the third pixel switching element PT3 and the fourth pixel switching element PT4 of the display panel 100 of FIG. 2 may be relatively high. Thus, as the driving frequency FR decreases, the black voltage V0 may be increased to prevent the black luminance from becoming higher than the target luminance.

In an embodiment, for example, as the driving frequency FR decreases, the anode initialization voltage VAINTR, VAINTG and VAINTB may decrease. When the driving frequency FR is small, the anode initialization voltage VAINTR, VAINTG and VAINTB may be decreased along with increasing the black voltage V0 to prevent the black luminance from becoming higher than the target luminance.

In an embodiment, for example, as the luminance setting value DIM increases, the black voltage V0 may increase. As the luminance setting value DIM increases, the black voltage V0 may naturally increase, and conversely, as the luminance setting value DIM decreases, the black voltage V0 may naturally decrease.

When the luminance setting value DIM is great, there is a risk that the black luminance becomes higher than the target luminance. When the luminance setting value DIM is small, there is a margin for further lowering the black voltage V0 such that the black voltage V0 may be substantially reduced.

In an embodiment, for example, as the luminance setting value DIM increases, the anode initialization voltage VAINTR, VAINTG and VAINTB may decrease. When the luminance setting value DIM is great, the anode initialization voltage VAINTR, VAINTG and VAINTB may be decreased along with increasing the black voltage V0 to prevent the black luminance from becoming higher than the target luminance.

In an embodiment, as shown in FIG. 7, the black voltage V0 (V0R, V0G and V0B) may have a same level regardless of the color of the pixel. The black voltage V0 (V0R, V0G and V0B) may have a same initial value V0T, have the same offset and accordingly, have a same result value VON regardless of the color of the pixel.

In an embodiment, as shown in FIG. 8, the anode initialization voltage VAINTR, VAINTG and VAINTB may have different levels according to the color of the pixel.

In an embodiment, for example, at least one selected from an initial value VAR1 of the first anode initialization voltage VAINTR of the first pixel, an initial value VAG1 of the second anode initialization voltage VAINTG of the second pixel and an initial value VAB of the third anode initialization voltage VAINTB of the third pixel may be different from the other initial values. At least one selected from an offset for changing the initial value VAR1 of the first anode initialization voltage VAINTR of the first pixel, an offset for changing the initial value VAG1 of the second anode initialization voltage VAINTG of the second pixel and an offset for changing the initial value VAB of the third anode initialization voltage VAINTB of the third pixel may be different from the other offsets. Although the offset for changing the initial value VAB of the third anode initialization voltage VAINTB is zero in an embodiment as shown in FIG. 9, the invention may not be limited thereto.

In an embodiment, for example, when changing the initial value of the anode initialization voltage VAINTR, VAINTG and VAINTB, the offset may be added or subtracted from the initial value of the anode initialization voltage VAINTR, VAINTG and VAINTB. In an embodiment, for example, the offset may have different values according to the color of the pixel based on weights according to the color of the pixel. In an embodiment, for example, a weight of the red pixel may be greater than a weight of the green pixel and a weight of the blue pixel. Thus, an absolute value of the offset of the red pixel may be greater than an absolute value of the offset of the green pixel and an absolute value of the offset of the blue pixel.

Therefore, at least one selected from the first anode initialization voltage VAR2, the second anode initialization voltage VAG2 and the third anode initialization voltage VAB may have the different value from the other anode initialization voltages. In an embodiment, for example, the first anode initialization voltage VAR2, the second anode initialization voltage VAG2 and the third anode initialization voltage VAB may have the different values from one another.

As shown in FIG. 9, in a conventional method of setting the black voltage at predetermined measuring points TH1, TH2 and TH3 of the luminance setting value, there is a risk that undesired high luminance is displayed in the interpolation region between the measuring points TH1, TH2 and TH3. A first curve C1 represents a case that the undesired high luminance is displayed in the interpolation region between the measuring points TH1, TH2 and TH3.

In an embodiment of the invention, as described above, the black voltage V0 and the anode initialization voltage VAINTR, VAINTG and VAINTB are properly set based on the luminance setting value such that the undesired high luminance may be effectively prevented from being displayed in the interpolation region between the predetermined measuring points TH1, TH2 and TH3 of the luminance setting value DIM. A second curve C2 represents a case that the undesired high luminance is not displayed in the interpolation region between the measuring points TH1, TH2 and TH3.

Referring back to FIG. 5, the method of driving the display panel 100 according to an embodiment includes determining initial values of the black voltage V0 for (or corresponding to) the driving frequencies FR and the luminance setting values DIM (operation S100), determining the black voltage V0 by changing the initial value of the black voltage V0 such that the measured luminance of the display panel 100 is less than the first target luminance LT1 (operations S100, S200 and S300), determining initial values of the anode initialization voltage VAINTR, VAINTG and VAINTB for the driving frequencies FR and the luminance setting values DIM (operation S400), determining the anode initialization voltage VAINTR, VAINTG and VAINTB by changing the initial value of the anode initialization voltage VAINTR, VAINTG and VAINTB such that the measured luminance of the display panel 100 is less than the second target luminance LT2 (operations S400, S500 and S600). The black voltages V0 and the anode initialization voltages VAINTR, VAINTG and VAINTB for the driving frequencies FR and the luminance setting values DIM may be stored in the memory 700. These processes may be included in an initial setting step of the display panel 100.

In an embodiment, for example, the initial values of the anode initialization voltage VAINTR, VAINTG and VAINTB may be determined for the driving frequencies FR and the luminance setting values DIM. In an embodiment, for example, the initial values of the anode initialization voltage VAINTR, VAINTG and VAINTB may be determined for the driving frequencies FR, the luminance setting values DIM and color quantitative values. In an embodiment, for example, the color quantitative value may be a tristimulus value. In a condition that the black luminance satisfies the target luminance, the color quantitative value (the tristimulus value) based on the anode initialization voltage VAINTR, VAINTG and VAINTB may be compared to a target color quantitative value (a target tristimulus value) and the initial value of the anode initialization voltage VAINTR, VAINTG and VAINTB may be adjusted. In this way, the black luminance and the color characteristic may be corrected.

In an embodiment, the method of driving the display panel 100 may further include generating the black voltage V0 and the anode initialization voltage VAINTR, VAINTG and VAINTB based on the input driving frequency FR and the input luminance setting value DIM, determining the data voltage based on the black voltage V0, outputting the data voltage to the pixel of the display panel 100 and outputting the anode initialization voltage VAINTR, VAINTG and VAINTB to the pixel. These processes may be included in steps in which the display panel 100 is driven by the user.

According to an embodiment, the driving controller 200 may determine the black voltage V0 and the anode initialization voltage VAINTR, VAINTG and VAINTB based on the driving frequency FR and the luminance setting value DIM. The anode initialization voltage VAINTR, VAINTG and VAINTB may be set differently according to a color of the pixel.

The black voltage V0 and the anode initialization voltage VAINTR, VAINTG and VAINTB are determined based on the driving frequency FR and the luminance setting value DIM such that the black luminance of the display panel 100 may be sufficiently reduced to match a target luminance without excessively increasing the black voltage V0.

In addition, the anode initialization voltage VAINTR, VAINTG and VAINTB is set differently according to the color of the pixel such that the black image may be effectively prevented from biased toward a specific color (e.g., reddish).

In addition, the black voltage V0 and the anode initialization voltage VAINTR, VAINTG and VAINTB are determined based on the luminance setting value DIM, a high black voltage than a predetermined desired voltage may not be used at the low luminance setting value such that a range between the lowest grayscale voltage (the black voltage) and the highest grayscale voltage may be substantially reduced. When the range between the lowest grayscale voltage (the black voltage) and the highest grayscale voltage is reduced, an instantaneous afterimage due to a hysteresis of the driving switching element may be effectively prevented and the power consumption may be substantially reduced.

In addition, the black voltage V0 and the anode initialization voltage VAINTR, VAINTG and VAINTB are determined based on the driving frequency FR and the luminance setting value DIM such that an undesired high luminance may be effectively prevented from being displayed in an interpolation range between the predetermined measuring points of the luminance setting value.

In addition, the black voltage V0 and the anode initialization voltage VAINTR, VAINTG and VAINTB are determined based on the driving frequency FR and the luminance setting value DIM such that a step efficiency characteristic, which refers to a luminance difference between a first frame and a second frame, may be enhanced.

Figure 10:
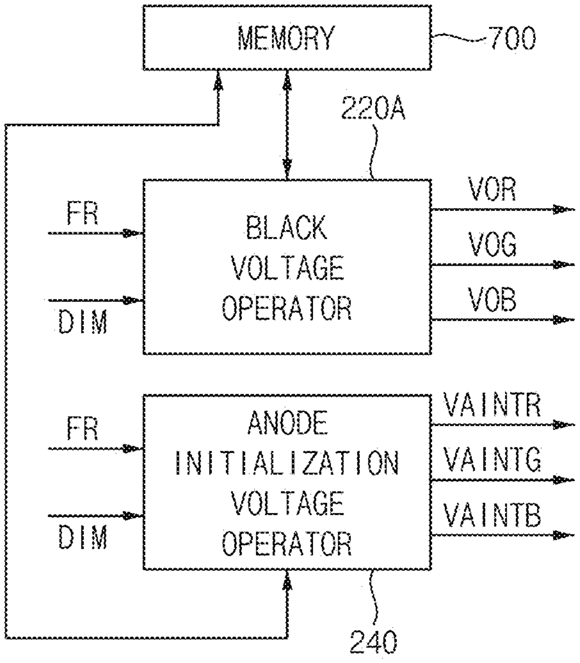
FIG. 10 is a block diagram illustrating a driving controller and a memory of a display apparatus according to an embodiment of the invention.
Figure 11:
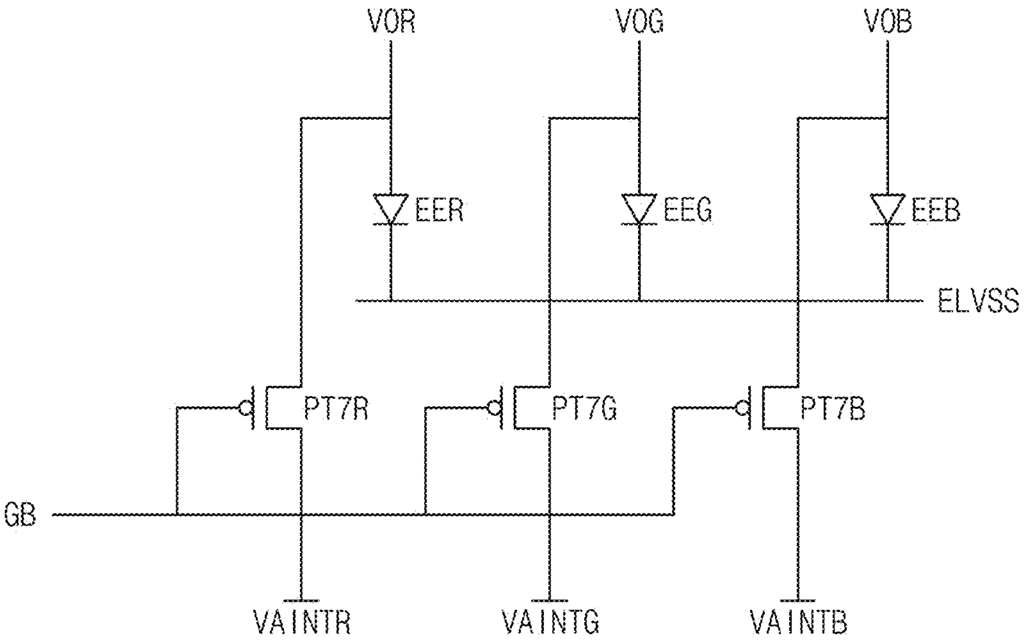
FIG. 11 is a circuit diagram illustrating a portion of the display panel of FIG. 1.
Figure 12:
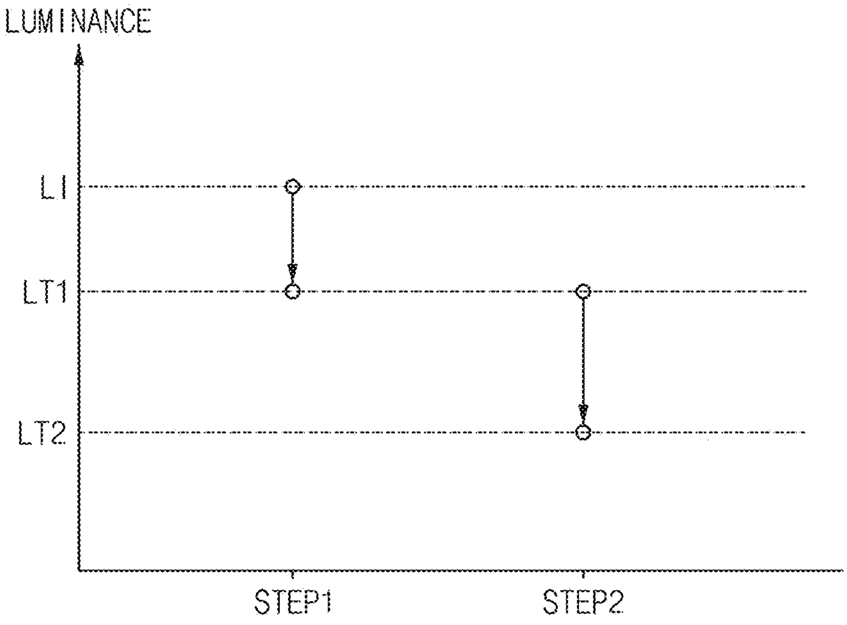
FIG. 12 is a graph illustrating a method of determining the black voltage of FIG. 11 and the anode initialization voltage of FIG. 11.
Figure 13:
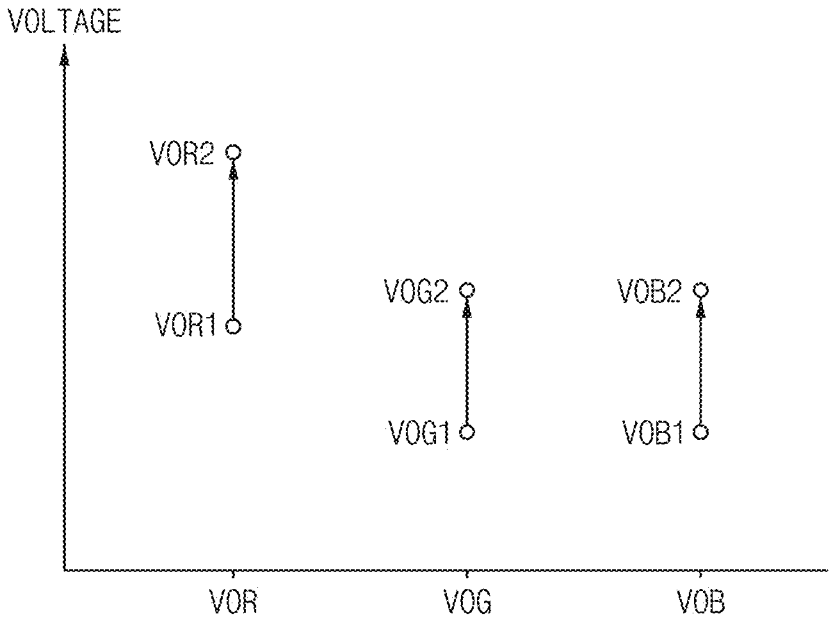
FIG. 13 is a graph illustrating a method of determining the black voltage of FIG. 11.
Figure 14:
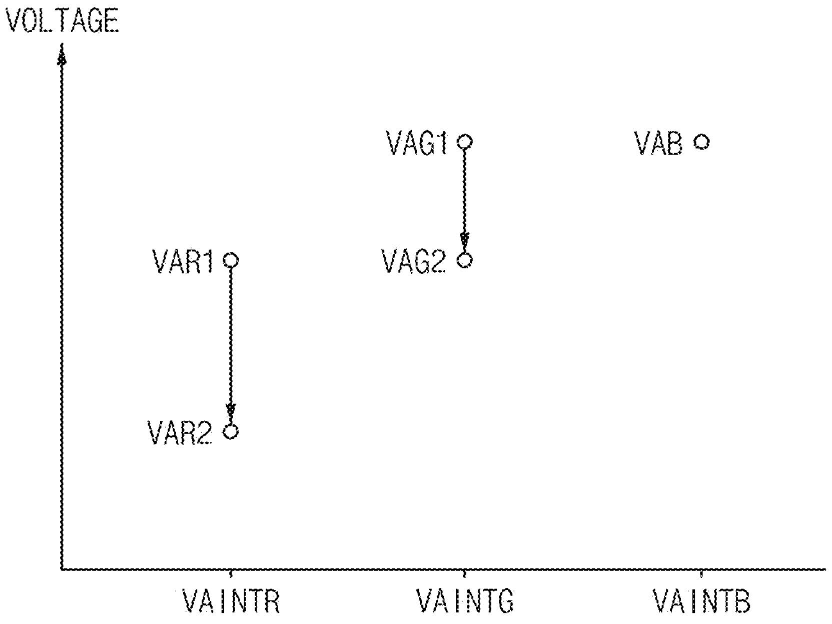
FIG. 14 is a graph illustrating a method of determining the anode initialization voltage of FIG. 11.

FIG. 10 is a block diagram illustrating a driving controller 200 and a memory 700 of a display apparatus according to an embodiment of the invention. FIG. 11 is a circuit diagram illustrating a portion of the display panel 100 of FIG. 1. FIG. 12 is a graph illustrating a method of determining the black voltage V0R, V0G and V0B of FIG. 11 and the anode initialization voltage VAINTR, VAINTG and VAINTB of FIG. 11. FIG. 13 is a graph illustrating a method of determining the black voltage V0R, V0G and V0B of FIG. 11. FIG. 14 is a graph illustrating a method of determining the anode initialization voltage VAINTR, VAINTG and VAINTB of FIG. 11.

The display apparatus according to the embodiment of FIGS. 10 to 14 is substantially the same as the display apparatus according to the embodiment described above referring to FIGS. 1 to 9 except that the black voltage is differently set according to the color of the pixel. Thus, the same reference numerals will be used to refer to the same or like elements as those described above with reference to FIGS. 1 to 9 and any repetitive detailed description of the same or like elements will be omitted.

Referring to FIGS. 1, 2 and 10 to 14, in an embodiment, the driving controller 200 determines the black voltage V0R, V0G and V0B based on the driving frequency FR and the luminance setting value DIM and the anode initialization voltage VAINTR, VAINTG and VAINTB based on the driving frequency FR and the luminance setting value DIM. A first anode initialization voltage (e.g., VAINTR) of a first pixel having a first color is different from a second anode initialization voltage (e.g., VAINTG) of a second pixel having a second color.

In an embodiment, a first black voltage (e.g., V0R) of a first pixel having a first color is different from a second black voltage (e.g., V0G) of a second pixel having a second color.

The driving controller 200 may include a black voltage operator 220A that determines the black voltage V0R, V0G and V0B based on the driving frequency FR and the luminance setting value DIM and an anode initialization voltage operator 240 that determines the anode initialization voltage VAINTR, VAINTG and VAINTB based on the driving frequency FR and the luminance setting value DIM.

The display panel 100 may include the first pixel (e.g., a red pixel) having the first color, the second pixel (e.g., a green pixel) having the second color and the third pixel (e.g., a blue pixel) having the third color.

In an embodiment, as shown in FIG. 11, the red pixel may include a red light emitting element EER and a red light emitting element initialization switching element PT7R, the green pixel may include a green light emitting element EEG and a green light emitting element initialization switching element PT7G and the blue pixel may include a blue light emitting element EEB and a blue light emitting element initialization switching element PT7B.

In an embodiment, an anode initialization voltage VAINTR of the red pixel may be different from at least one selected from an anode initialization voltage VAINTG of the green pixel and an anode initialization voltage VAINTB of the blue pixel.

In an embodiment, for example, the anode initialization voltage VAINTR of the red pixel may be less than the anode initialization voltage VAINTG of the green pixel. The anode initialization voltage VAINTG of the green pixel may be less than the anode initialization voltage VAINTB of the blue pixel.

In an embodiment, a black voltage V0R of the red pixel may be different from at least one selected from a black voltage V0G of the green pixel and a black voltage V0B of the blue pixel.

In an embodiment, for example, the black voltage V0R of the red pixel may be greater than the black voltage V0G of the green pixel. The black voltage V0G of the green pixel may be greater than the black voltage V0B of the blue pixel.

In an embodiment, as shown in FIGS. 12 to 14, the black voltage V0R, V0G and V0B may be determined in a way such that a measured luminance of the display panel 100 is less than a first target luminance LT1 (STEP1). In addition, the anode initialization voltage VAINTR, VAINTG and VAINTB may be determined in a way such that the measured luminance of the display panel 100 is less than a second target luminance LT2 less than the first target luminance LT1 (STEP2).

In an embodiment, the measured luminance may be controlled to be less than the first target luminance LT1 by adjusting the black voltage V0R, V0G and V0B. However, when the measured luminance is controlled to be less than the first target luminance LT1 by adjusting the black voltage V0R, V0G and V0B, the black voltage V0R, V0G and V0B may become excessively high such that the display quality may be deteriorated and the power consumption may increase. Thus, in an embodiment, after the measured luminance is controlled to be less than the first target luminance LT1 by adjusting the black voltage V0R, V0G and V0B, the measured luminance may be controlled to be less than the second target luminance LT2 by adjusting the anode initialization voltage VAINTR, VAINTG and VAINTB.

In an embodiment, as shown in FIG. 13, the black voltage V0R, V0G and V0B may have the different levels according to the color of the pixel. At least one selected from an initial value V0R 1 of the first black voltage V0R of the first pixel, an initial value V0G1 of the second black voltage V0G of the second pixel and an initial value V0B1 of the third black voltage V0B of the third pixel may be different from the other initial values. At least one selected from an offset V0R2-V0R1 for changing the initial value V0R1 of the first black voltage V0R of the first pixel, an offset V0G2-V0G1 for changing the initial value V0G1 of the second black voltage V0G of the second pixel and an offset V0B2-V0B1 for changing the initial value V0B1 of the third black voltage V0B of the third pixel may be different from the other offsets.

In an embodiment, for example, when changing the initial value of the black voltage V0R, V0G and V0B, the offset may be added or subtracted from the initial value of the black voltage V0R, V0G and V0B. In an embodiment, for example, the offset may have different values according to the color of the pixel based on weights according to the color of the pixel. In an embodiment, for example, a weight of the red pixel may be greater than a weight of the green pixel and a weight of the blue pixel. Thus, an absolute value of the offset of the red pixel may be greater than an absolute value of the offset of the green pixel and an absolute value of the offset of the blue pixel.

In an embodiment, as shown in FIG. 14, the anode initialization voltage VAINTR, VAINTG and VAINTB may have different levels according to the color of the pixel.

In an embodiment, for example, at least one selected from an initial value VAR1 of the first anode initialization voltage VAINTR of the first pixel, an initial value VAG1 of the second anode initialization voltage VAINTG of the second pixel and an initial value VAB of the third anode initialization voltage VAINTB of the third pixel may be different from the other initial values. At least one selected from an offset for changing the initial value VAR1 of the first anode initialization voltage VAINTR of the first pixel, an offset for changing the initial value VAG1 of the second anode initialization voltage VAINTG of the second pixel and an offset for changing the initial value VAB of the third anode initialization voltage VAINTB of the third pixel may be different from the other offsets. Although the offset for changing the initial value VAB of the third anode initialization voltage VAINTB is zero in an embodiment, as shown in FIG. 14, the invention may not be limited thereto.

In an embodiment, for example, when changing the initial value of the anode initialization voltage VAINTR, VAINTG and VAINTB, the offset may be added or subtracted from the initial value of the anode initialization voltage VAINTR, VAINTG and VAINTB. In an embodiment, for example, the offset may have different values according to the color of the pixel based on weights according to the color of the pixel.

Therefore, at least one selected from the first anode initialization voltage VAR2, the second anode initialization voltage VAG2 and the third anode initialization voltage VAB may have the different value from the other anode initialization voltages. In an embodiment, for example, the first anode initialization voltage VAR2, the second anode initialization voltage VAG2 and the third anode initialization voltage VAB may have the different values from one another.

According to an embodiment, the driving controller 200 may determine the black voltage V0R, V0G and V0B and the anode initialization voltage VAINTR, VAINTG and VAINTB based on the driving frequency FR and the luminance setting value DIM. The black voltage V0R, V0G and V0B and the anode initialization voltage VAINTR, VAINTG and VAINTB may be set differently based on a color of the pixel.

The black voltage V0R, V0G and V0B and the anode initialization voltage VAINTR, VAINTG and VAINTB are determined based on the driving frequency FR and the luminance setting value DIM such that the black luminance of the display panel 100 may be sufficiently reduced to match a target luminance without excessively increasing the black voltage V0R, V0G and V0B.

In addition, the anode initialization voltage VAINTR, VAINTG and VAINTB is set differently according to the color of the pixel such that the black image may be effectively prevented from biased toward a specific color (e.g., reddish).

In addition, the black voltage V0R, V0G and V0B and the anode initialization voltage VAINTR, VAINTG and VAINTB are determined based on the luminance setting value DIM, a high black voltage than a predetermined desired voltage may not be used at the low luminance setting value such that a range between the lowest grayscale voltage (the black voltage) and the highest grayscale voltage may be substantially reduced. When the range between the lowest grayscale voltage (the black voltage) and the highest grayscale voltage is reduced, an instantaneous afterimage due to a hysteresis of the driving switching element may be effectively prevented and the power consumption may be substantially reduced.

In addition, the black voltage V0R, V0G and V0B and the anode initialization voltage VAINTR, VAINTG and VAINTB are determined based on the driving frequency FR and the luminance setting value DIM such that an undesired high luminance may be effectively prevented from being displayed in an interpolation range between the predetermined measuring points of the luminance setting value.

In addition, the black voltage V0R, V0G and V0B and the anode initialization voltage VAINTR, VAINTG and VAINTB are determined based on the driving frequency FR and the luminance setting value DIM such that a step efficiency characteristic, which refers to a luminance difference between a first frame and a second frame, may be enhanced.

Figure 15:
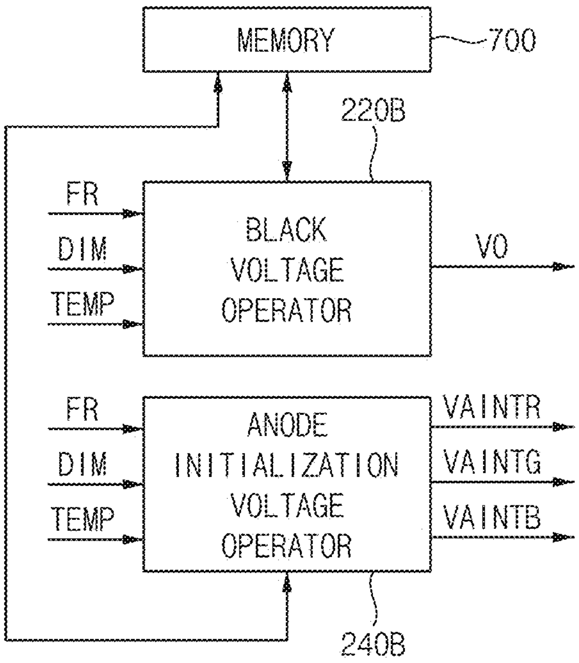
FIG. 15 is a block diagram illustrating a driving controller and a memory of a display apparatus according to an embodiment of the invention.

FIG. 15 is a block diagram illustrating a driving controller 200 and a memory 700 of a display apparatus according to an embodiment of the invention.

The display apparatus according to the embodiment of FIG. 15 is substantially the same as the display apparatus according to the embodiment described above referring to FIGS. 1 to 9 except that the black voltage and the anode initialization voltage are determined based on the driving frequency, the luminance setting value and a temperature. Thus, the same reference numerals will be used to refer to the same or like elements as those described above referring to FIGS. 1 to 9 and any repetitive detailed description of the same or like elements will be omitted.

Referring to FIGS. 1, 2, 5 to 9 and 15, in an embodiment, the driving controller 200 determines the black voltage V0 based on the driving frequency FR, the luminance setting value DIM and the temperature TEMP and the anode initialization voltage VAINTR, VAINTG and VAINTB based on the driving frequency FR, the luminance setting value DIM and the temperature TEMP. A first anode initialization voltage (e.g., VAINTR) of a first pixel having a first color is different from a second anode initialization voltage (e.g., VAINTG) of a second pixel having a second color.

In an embodiment, the black voltage V0 may have a same level regardless of the color of the pixel, that is, a same block voltage V0 may be applied to each pixel.

The driving controller 200 may include a black voltage operator 220B that determines the black voltage V0 based on the driving frequency FR, the luminance setting value DIM and the temperature TEMP and an anode initialization voltage operator 240B that determines the anode initialization voltage VAINTR, VAINTG and VAINTB based on the driving frequency FR, the luminance setting value DIM and the temperature TEMP.

In an embodiment, for example, as the temperature TEMP increases, the black voltage V0 may increase. When the temperature TEMP is high, a mobility of the pixel switching elements in the display panel 100 of FIG. 2 may be high. Thus, a risk of current leakage occurring through the third pixel switching element PT3 and the fourth pixel switching element PT4 of the display panel 100 of FIG. 2 may increase. Thus, in an embodiment, as the temperature TEMP increases, the black voltage V0 may be increased to effectively prevent the black luminance from becoming higher than the target luminance.

In an embodiment, for example, as the temperature TEMP increases, the anode initialization voltage VAINTR, VAINTG and VAINTB may decrease. When the temperature TEMP is high, the anode initialization voltage VAINTR, VAINTG and VAINTB may be decreased along with increasing the black voltage V0 to effectively prevent the black luminance from becoming higher than the target luminance.

Referring back to FIG. 5, the method of driving the display panel 100 according to an embodiment includes determining initial values of the black voltage V0 for the driving frequencies FR, the luminance setting values DIM and the temperature TEMP (operation S100), determining the black voltage V0 by changing the initial value of the black voltage V0 such that the measured luminance of the display panel 100 is less than the first target luminance LT1 (operations S100, S200 and S300), determining initial values of the anode initialization voltage VAINTR, VAINTG and VAINTB for the driving frequencies FR, the luminance setting values DIM and the temperature TEMP (operation S400), determining the anode initialization voltage VAINTR, VAINTG and VAINTB by changing the initial value of the anode initialization voltage VAINTR, VAINTG and VAINTB such that the measured luminance of the display panel 100 is less than the second target luminance LT2 (operations S400, S500 and S600). The black voltages V0 and the anode initialization voltages VAINTR, VAINTG and VAINTB for the driving frequencies FR, the luminance setting values DIM and the temperature TEMP may be stored in the memory 700. These processes may be included in an initial setting step of the display panel 100.

The method of driving the display panel 100 may further include generating the black voltage V0 and the anode initialization voltage VAINTR, VAINTG and VAINTB based on the input driving frequency FR, the input luminance setting value DIM and an input temperature TEMP, determining the data voltage based on the black voltage V0, outputting the data voltage to the pixel of the display panel 100 and outputting the anode initialization voltage VAINTR, VAINTG and VAINTB to the pixel. These processes may be included in steps in which the display panel 100 is driven by the user.

According to an embodiment, the driving controller 200 may determine the black voltage V0 and the anode initialization voltage VAINTR, VAINTG and VAINTB based on the driving frequency FR, the luminance setting value DIM and the temperature TEMP. The anode initialization voltage VAINTR, VAINTG and VAINTB may be set differently according to a color of the pixel.

The black voltage V0 and the anode initialization voltage VAINTR, VAINTG and VAINTB are determined based on the driving frequency FR, the luminance setting value DIM and the temperature TEMP such that the black luminance of the display panel 100 may be sufficiently reduced to match a target luminance without excessively increasing the black voltage V0.

In addition, the anode initialization voltage VAINTR, VAINTG and VAINTB is set differently according to the color of the pixel such that the black image may be effectively prevented from biased toward a specific color (e.g., reddish).

In addition, the black voltage V0 and the anode initialization voltage VAINTR, VAINTG and VAINTB are determined based on the luminance setting value DIM, a high black voltage than a predetermined desired voltage may not be used at the low luminance setting value such that a range between the lowest grayscale voltage (the black voltage) and the highest grayscale voltage may be substantially reduced. When the range between the lowest grayscale voltage (the black voltage) and the highest grayscale voltage is reduced, an instantaneous afterimage due to a hysteresis of the driving switching element may be effectively prevented and the power consumption may be substantially reduced.

In addition, the black voltage V0 and the anode initialization voltage VAINTR, VAINTG and VAINTB are determined based on the driving frequency FR, the luminance setting value DIM and the temperature TEMP such that an undesired high luminance may be effectively prevented from being displayed in an interpolation range between the predetermined measuring points of the luminance setting value.

In addition, the black voltage V0 and the anode initialization voltage VAINTR, VAINTG and VAINTB are determined based on the driving frequency FR, the luminance setting value DIM and the temperature TEMP such that a step efficiency characteristic, which refers to a luminance difference between a first frame and a second frame, may be enhanced.

Figure 16:
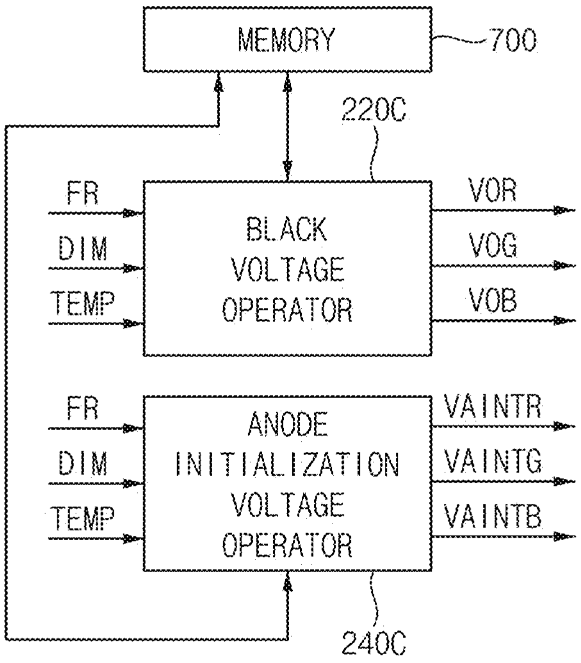
FIG. 16 is a block diagram illustrating a driving controller and a memory of a display apparatus according to an embodiment of the invention.

FIG. 16 is a block diagram illustrating a driving controller and a memory of a display apparatus according to an embodiment of the invention.

The display apparatus according to the embodiment of FIG. 16 is substantially the same as the display apparatus according to the embodiment described above referring to FIGS. 10 to 14 except that the black voltage and the anode initialization voltage are determined based on the driving frequency, the luminance setting value and a temperature. Thus, the same reference numerals will be used to refer to the same or like elements as those described in above with reference to FIGS. 10 to 14 and any repetitive detailed description of the same or like elements will be omitted.

Referring to FIGS. 1, 2, 11 to 14 and 16, in an embodiment, the driving controller 200 determines the black voltage V0R, V0G and V0B based on the driving frequency FR, the luminance setting value DIM and the temperature TEMP and the anode initialization voltage VAINTR, VAINTG and VAINTB based on the driving frequency FR, the luminance setting value DIM and the temperature TEMP. A first anode initialization voltage (e.g., VAINTR) of a first pixel having a first color is different from a second anode initialization voltage (e.g., VAINTG) of a second pixel having a second color.

In an embodiment, a first black voltage (e.g., V0R) of a first pixel having a first color is different from a second black voltage (e.g., V0G) of a second pixel having a second color.

The driving controller 200 may include a black voltage operator 220C that determines the black voltage V0R, V0G and V0B based on the driving frequency FR, the luminance setting value DIM and the temperature TEMP and an anode initialization voltage operator 240C that determines the anode initialization voltage VAINTR, VAINTG and VAINTB based on the driving frequency FR, the luminance setting value DIM and the temperature TEMP.

In an embodiment, an anode initialization voltage VAINTR of the red pixel may be different from at least one selected from an anode initialization voltage VAINTG of the green pixel and an anode initialization voltage VAINTB of the blue pixel.

In an embodiment, for example, the anode initialization voltage VAINTR of the red pixel may be less than the anode initialization voltage VAINTG of the green pixel. The anode initialization voltage VAINTG of the green pixel may be less than the anode initialization voltage VAINTB of the blue pixel.

In an embodiment, a black voltage V0R of the red pixel may be different from at least one selected from a black voltage V0G of the green pixel and a black voltage V0B of the blue pixel.

In an embodiment, for example, the black voltage V0R of the red pixel may be greater than the black voltage V0G of the green pixel. The black voltage V0G of the green pixel may be greater than the black voltage V0B of the blue pixel.

According to an embodiment, the driving controller 200 may determine the black voltage V0R, V0G and V0B and the anode initialization voltage VAINTR, VAINTG and VAINTB based on the driving frequency FR, the luminance setting value DIM and the temperature TEMP. The black voltage V0R, V0G and V0B and the anode initialization voltage VAINTR, VAINTG and VAINTB may be set differently according to a color of the pixel.

The black voltage V0R, V0G and V0B and the anode initialization voltage VAINTR, VAINTG and VAINTB are determined based on the driving frequency FR, the luminance setting value DIM and the temperature TEMP such that the black luminance of the display panel 100 may be sufficiently reduced to match a target luminance without excessively increasing the black voltage V0R, V0G and V0B.

In addition, the anode initialization voltage VAINTR, VAINTG and VAINTB is set differently according to the color of the pixel such that the black image may be effectively prevented from biased toward a specific color (e.g., reddish).

In addition, the black voltage V0R, V0G and V0B and the anode initialization voltage VAINTR, VAINTG and VAINTB are determined based on the luminance setting value DIM, a high black voltage than a predetermined desired voltage may not be used at the low luminance setting value such that a range between the lowest grayscale voltage (the black voltage) and the highest grayscale voltage may be substantially reduced. When the range between the lowest grayscale voltage (the black voltage) and the highest grayscale voltage is reduced, an instantaneous afterimage due to a hysteresis of the driving switching element may be effectively prevented and the power consumption may be substantially reduced.

In addition, the black voltage V0R, V0G and V0B and the anode initialization voltage VAINTR, VAINTG and VAINTB are determined based on the driving frequency FR, the luminance setting value DIM and the temperature TEMP such that an undesired high luminance may be effectively prevented from being displayed in an interpolation range between the predetermined measuring points of the luminance setting value.

In addition, the black voltage V0R, V0G and V0B and the anode initialization voltage VAINTR, VAINTG and VAINTB are determined based on the driving frequency FR, the luminance setting value DIM and the temperature TEMP such that a step efficiency characteristic, which refers to a luminance difference between a first frame and a second frame, may be enhanced.

Figure 17:
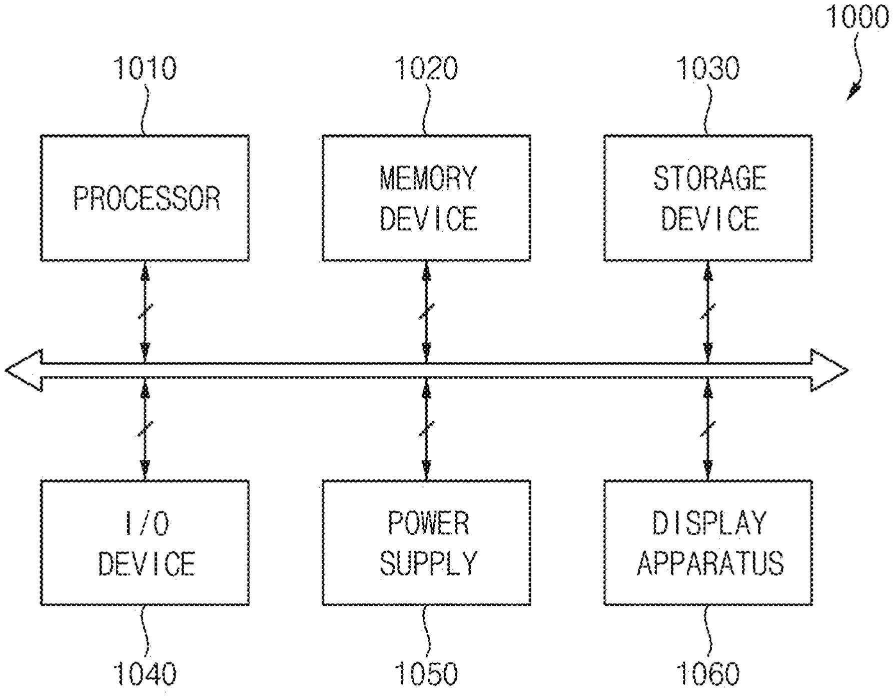
FIG. 17 is a block diagram illustrating an electronic apparatus according to an embodiment of the invention.
Figure 18:
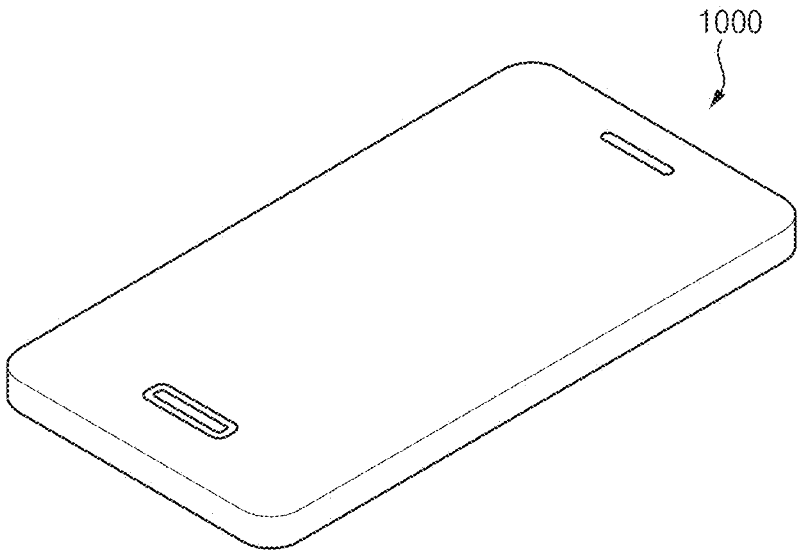
FIG. 18 is a diagram illustrating an embodiment in which the electronic apparatus of FIG. 17 is implemented as a smartphone.
Figure 19:
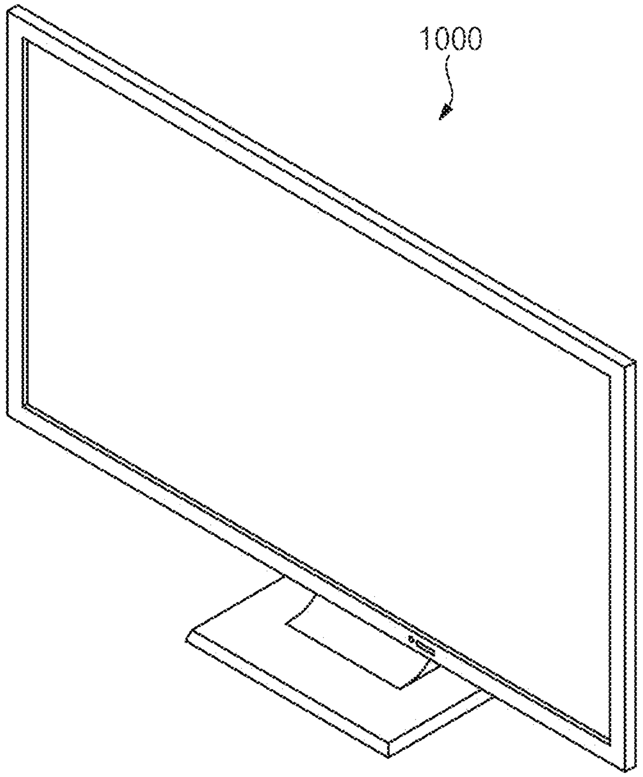
FIG. 19 is a diagram illustrating an embodiment in which the electronic apparatus of FIG. 17 is implemented as a monitor.

FIG. 17 is a block diagram illustrating an electronic apparatus 1000 according to an embodiment of the invention. FIG. 18 is a diagram illustrating an example in which the electronic apparatus 1000 of FIG. 17 is implemented as a smartphone. FIG. 19 is a diagram illustrating an example in which the electronic apparatus 1000 of FIG. 17 is implemented as a monitor.

Referring to FIGS. 17 to 19, an embodiment of the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 18, the electronic apparatus 1000 may be implemented as a smartphone. In an embodiment, as illustrated in FIG. 19, the electronic apparatus 1000 may be implemented as a monitor. However, the electronic apparatus 1000 is not limited thereto. In an embodiment, for example, the electronic apparatus 1000 may be implemented as a television, a cellular phone, a video phone, a smart pad, a smart watch, a tablet computer, a car navigation system, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1. The processor 1010 may also be referred to a host.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to embodiments of the display apparatus, the method of driving the display panel using the display apparatus and the electronic apparatus including the display apparatus, the display quality of the display panel may be enhanced and the power consumption of the display apparatus may be substantially reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel;

a data driver which outputs a data voltage to the display panel; and a driving controller which determines a black voltage based on a driving frequency, a temperature, and a luminance setting value and determines an anode initialization voltage based on the driving frequency, the temperature, and the luminance setting value, wherein the luminance setting value comprises a value representing a degree of luminance of the display panel that is set by a user or set based on an ambient luminance, wherein a first anode initialization voltage of a first pixel having a first color is different from a second anode initialization voltage of a second pixel having a second color.

2. The display apparatus of claim 1, wherein the black voltage is determined in a way such that a measured luminance of the display panel is less than a first target luminance.

3. The display apparatus of claim 2, wherein the anode initialization voltage is determined in a way such that the measured luminance of the display panel is less than a second target luminance less than the first target luminance.

4. The display apparatus of claim 1, wherein the display panel includes the first pixel having the first color, the second pixel having the second color and a third pixel having a third color, wherein at least one selected from an initial value of the first anode initialization voltage of the first pixel, an initial value of the second anode initialization voltage of the second pixel and an initial value of a third anode initialization voltage of the third pixel is different from another initial value selected therefrom, and wherein at least one selected from an offset for changing the initial value of the first anode initialization voltage of the first pixel, an offset for changing the initial value of the second anode initialization voltage of the second pixel and an offset for changing the initial value of the third anode initialization voltage of the third pixel is different from another offset selected therefrom.

5. The display apparatus of claim 1, wherein an anode initialization voltage of a red pixel is different from at least one selected from an anode initialization voltage of a green pixel and an anode initialization voltage of a blue pixel.

6. The display apparatus of claim 5, wherein the anode initialization voltage of the red pixel is less than the anode initialization voltage of the green pixel, and wherein the anode initialization voltage of the green pixel is less than the anode initialization voltage of the blue pixel.

7. The display apparatus of claim 1, wherein the black voltage has a same level regardless of a color of a pixel.

8. The display apparatus of claim 1, wherein a first black voltage of the first pixel having the first color is different from a second black voltage of the second pixel having the second color.

9. The display apparatus of claim 8, wherein the display panel includes the first pixel having the first color, the second pixel having the second color and a third pixel having a third color, wherein at least one selected from an initial value of the first black voltage of the first pixel, an initial value of the second black voltage of the second pixel and an initial value of a third black voltage of the third pixel is different from another initial value selected therefrom, and wherein at least one selected from an offset for changing the initial value of the first black voltage of the first pixel, an offset for changing the initial value of the second black voltage of the second pixel and an offset for changing the initial value of the third black voltage of the third pixel is different from another offset selected therefrom.

10. The display apparatus of claim 8, wherein a black voltage of a red pixel is different from at least one selected from a black voltage of a green pixel and a black voltage of a blue pixel.

11. The display apparatus of claim 10, wherein the black voltage of the red pixel is greater than the black voltage of the green pixel, and wherein the black voltage of the green pixel is greater than the black voltage of the blue pixel.

12. The display apparatus of claim 1, wherein as the driving frequency decreases, the black voltage increases.

13. The display apparatus of claim 12, wherein as the driving frequency decreases, the anode initialization voltage decreases.

14. The display apparatus of claim 1, wherein as the luminance setting value increases, the black voltage increases.

15. The display apparatus of claim 14, wherein as the luminance setting value increases, the anode initialization voltage decreases.

16. The display apparatus of claim 1, wherein the black voltage has a same level regardless of a color of a pixel.

17. The display apparatus of claim 1, wherein a first black voltage of the first pixel having the first color is different from a second black voltage of the second pixel having the second color.

18. The display apparatus of claim 1, wherein as the temperature increases, the black voltage increases.

19. The display apparatus of claim 18, wherein as the temperature increases, the anode initialization voltage decreases.

20. The display apparatus of claim 1, wherein the display panel comprises a pixel, and wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives a first initialization voltage and a second electrode connected to the first pixel node;

a fifth pixel switching element including a control electrode which receives an emission signal, a first electrode which receive a first pixel power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives the anode initialization voltage and a second electrode connected to the anode electrode of the light emitting element; and the light emitting element including the anode electrode and a cathode electrode which receive a second pixel power voltage.

21. A method of driving a display panel, the method comprising:

determining initial values of a black voltage based on driving frequencies, temperatures, and luminance setting values;

determining the black voltage by changing an initial value of the black voltage in a way such that a measured luminance of the display panel is less than a first target luminance;

determining initial values of an anode initialization voltage based on the driving frequencies, the temperatures, and the luminance setting values;

determining the anode initialization voltage by changing the initial values of the anode initialization voltage in a way such that the measured luminance of the display panel is less than a second target luminance less than the first target luminance;

storing black voltages and anode initialization voltages for the driving frequencies and the luminance setting values in a memory;

generating the black voltage and the anode initialization voltage based on an input driving frequency and an input luminance setting value, wherein the input luminance setting value comprises a value representing a degree of luminance of the display panel that is set by a user, set based on an ambient luminance, or set based on a maximum luminance value for a maximum grayscale value;

determining a data voltage based on the black voltage;

outputting the data voltage to a pixel of the display panel; and outputting the anode initialization voltage to the pixel.

22. A method of driving a display panel, the method comprising:

determining initial values of a black voltage for driving frequencies, luminance setting values and temperatures;

determining the black voltage by changing an initial value of the black voltage in a way such that a measured luminance of the display panel is less than a first target luminance;

determining initial values of an anode initialization voltage for the driving frequencies, the luminance setting values and the temperatures;

determining the anode initialization voltage by changing the initial values of the anode initialization voltage in a way such that the measured luminance of the display panel is less than a second target luminance less than the first target luminance;

storing black voltages and anode initialization voltages for the driving frequencies, the luminance setting values and the temperatures in a memory;

generating the black voltage and the anode initialization voltage based on an input driving frequency, an input luminance setting value and an input temperature;

determining a data voltage based on the black voltage;

outputting the data voltage to a pixel of the display panel; and outputting the anode initialization voltage to the pixel.

23. An electronic apparatus comprising:

a display panel;

a data driver which outputs a data voltage to the display panel;

a driving controller which controls the data driver; and a host which outputs input image data and an input control signal to the driving controller, wherein the driving controller determines a black voltage based on a driving frequency, a temperature, and a luminance setting value and determines an anode initialization voltage based on the driving frequency, the temperature, and the luminance setting value, wherein the luminance setting value comprises a value representing a degree of luminance of the display panel that is set by a user, set based on an ambient luminance, or set based on a maximum luminance value for a maximum grayscale value, and wherein a first anode initialization voltage of a first pixel having a first color is different from a second anode initialization voltage of a second pixel having a second color.

* * * * *